United States Patent [19]
Azumi et al.

[11] Patent Number: 5,622,236
[45] Date of Patent: Apr. 22, 1997

[54] GUIDANCE SYSTEM FOR SELF-ADVANCING VEHICLE

[75] Inventors: Yasuhiro Azumi; Mitsuo Sado, both of Kanagawa, Japan

[73] Assignee: S. C. Johnson & Son, Inc., Racine, Wis.

[21] Appl. No.: 447,323

[22] Filed: May 22, 1995

[30] Foreign Application Priority Data

Oct. 30, 1992 [JP] Japan .................................. 4-314345

[51] Int. Cl.$^6$ ...................................................... B62D 1/02
[52] U.S. Cl. ............................ 180/168; 318/587; 180/169
[58] Field of Search .................................... 180/167, 168, 180/169; 364/424.02, 424.01; 318/587, 580

[56] References Cited

FOREIGN PATENT DOCUMENTS

| | | |
|---|---|---|
| 57-128119 | 8/1982 | Japan . |
| 2-56610 | 2/1990 | Japan . |
| 3-237958 | 10/1991 | Japan . |

OTHER PUBLICATIONS

Abstract of Japanese Published patent application No. 06–149350 from JAPIO Japanese Patent Computer Database (one page).

*Primary Examiner*—Richard M. Camby
*Attorney, Agent, or Firm*—R. E. Rakoczy; J. W. Frank

[57] ABSTRACT

A guidance system for a self-advancing vehicle such as a floor washing machine is provided in an arrangement which does not spoil the beauty of, for example, a floor surface, which can be reused multiple times, which is low in cost and which more reliably follows a guidance line. A guidance line is drawn with a luminous material or with a coating material mainly consisting thereof along a predetermined traveling path on a floor surface. The guidance line is drawn on the floor surface with a mixture in which the luminous material is dissolved or dispersed in a solvent. Alternatively, a mixture in which the luminous material is mixed with a coating agent such as floor polish or wax is applied to the floor surface to draw the guidance line. The luminous material is, for example, an ultraviolet-absorbing material, an infrared-absorbing material or a visible light-absorbing material. A self-advancing floor washing machine using the present invention comprises a traveling device with two casters and two independent drive wheels, the latter of which are guided by a combination of one or more photosensors which track the guidance line and send a signal to a control unit that controls the drive wheels. Based on the signals from the photosensors, the machine is guided along the guidance line.

7 Claims, 2 Drawing Sheets

GUIDANCE SYSTEM FOR SELF-ADVANCING VEHICLE

BACKGROUND OF THE INVENTION

1. Field of the Invention

The present invention relates to a guidance system for a self-advancing vehicle such as a floor washing machine, which is arranged to control the traveling direction of the self-advancing vehicle along a guidance line drawn along a predetermined traveling path on a floor surface.

2. Related Background Art

Self-advancing vehicles that perform various operations without an operator while automatically traveling on a floor surface, for example such as automatic floor washers, vacuum cleaners, or carrying vehicles, are known. One such conventional guidance system for automatically controlling the traveling direction is described in Japanese Published Patent Application No. 57-128119 to Isamu. It teaches a system for guiding the self-advancing vehicle used a photosensor attached to the self-advancing vehicle that detected reflected light from a reflective tape which was previously adhered onto the floor surface along an intended traveling path.

The above guidance system with reflective tape, however, had such problems that the reflective tape was conspicuous and spoiled the beauty. Particularly in the case of floor washers, a rotary brush could abrade or peel off the reflective tape. That required frequent tape exchange, and thus created problems for wide areas.

There was another conventional system described in Japanese Published Patent Application No. 3-237958 to Hidetaka et. al. in which a laser source was set on the ceiling to emit a laser beam toward the floor surface. The traveling direction was controlled by detecting the laser beam using a photosensor mounted on the self-advancing vehicle.

This laser beam guidance system, however, had problems in that costs for apparatus and installation were high and that it could become disabled when the laser beam was interrupted by an obstacle or the like.

Japanese Published Patent Application No. Hei 2[1990]-56610 to Toshihiro et al. teaches an optical guidance system for moving vehicles. A guide path is coated with a strip of transparent paint that selectively absorbs or reflects light outside of the visible range. A series of three sensors detects light absorbed or reflected from the paint to keep the moving vehicle following the paint line. The center sensor detects the paint strip. The other two sensors monitor the unpainted floor and detect when the vehicle is moving off the paint strip. They steer the vehicle back to following the paint strip. One problem with this system is that dirt on the floor makes it harder for the sensors to keep the vehicle following the paint strip because the dirt makes the paint strip harder to distinguish from the floor next to the strip.

SUMMARY OF THE INVENTION

The present invention has been accomplished to solve the above problems with conventional systems. An object of the invention is to provide a guidance system for a self-advancing vehicle which does not spoil the beauty of the floor surface, which can be reused multiple times, and which is low in cost.

A guidance system for self-advancing vehicle according to the present invention is characterized in that a guidance line is drawn with a luminous material or a coating material mainly consisting thereof along a predetermined traveling path on the floor surface. The traveling direction of the self-advancing vehicle is controlled by detecting light emitted from the luminous matter by mean of a photosensor provided on a self-advancing vehicle. The luminous material is dissolved or dispersed in a solvent, or is mixed with a coating agent such as floor polish, and the mixture is applied onto the floor surface to draw a guidance line. The luminous coloring material may be an ultraviolet-absorbing material, an infrared-absorbing material, or a visible-light-absorbing material. A protective coating agent such as floor polish is applied onto the guidance line thus drawn to protect it from abrasion.

Effects of the guidance system according to the present invention are as follows.

(1) Since the guidance line is drawn with the luminous matter, specifically the ultraviolet-absorbing material or the infrared-absorbing material, etc., which is rarely observed by the eye or is inconspicuous, the beauty of the floor surface is not spoiled.

(2) Since the coating agent such as floor polish is applied over the luminous material deposited on the floor surface, the luminous material can be reused multiple times for as long as the coating agent such as floor polish remains.

(3) Since no extra construction is needed for buildings or the like, this system can be provided at low cost.

(4) Since in the preferred embodiment, the photosensor directly tracks the luminous material in the guidance line only, dirt covering the guidance line is less likely to cause the self-advancing vehicle to deviate from the guidance line.

Further objects and effects of the invention will be apparent from the description of the preferred embodiments as illustrated in the accompanying drawings.

DESCRIPTION OF THE PREFERRED EMBODIMENTS

Figure 1A:
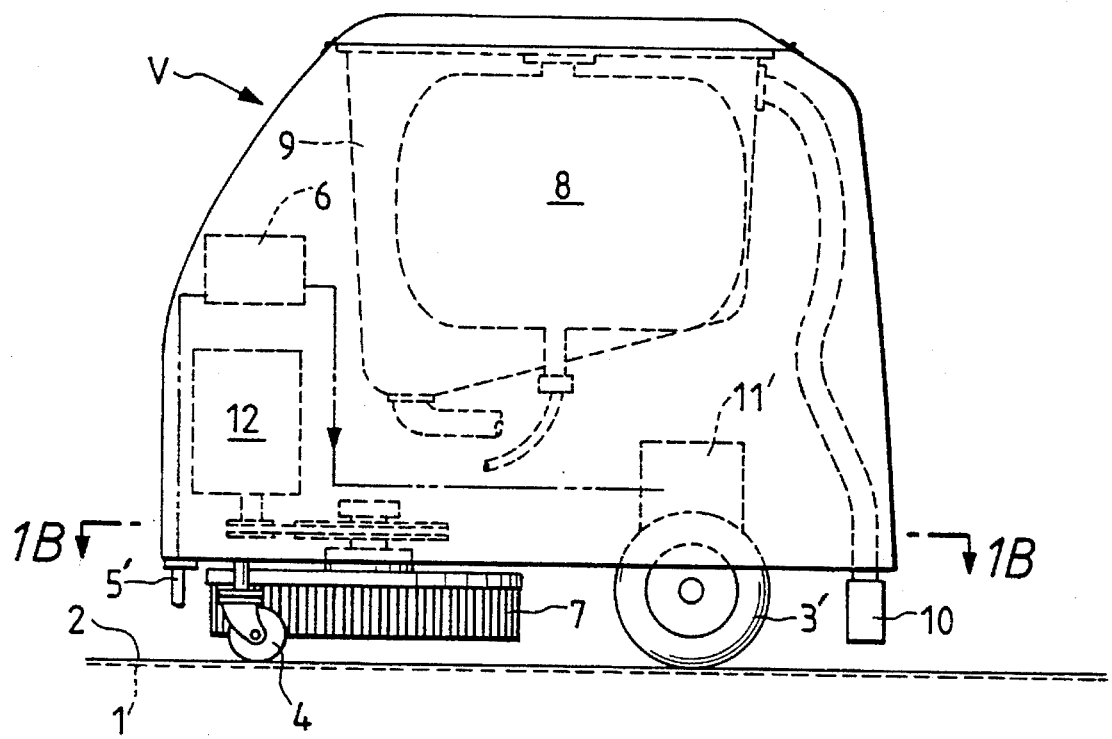
FIG. 1A is a side view of a floor washing machine.
Figure 1B:
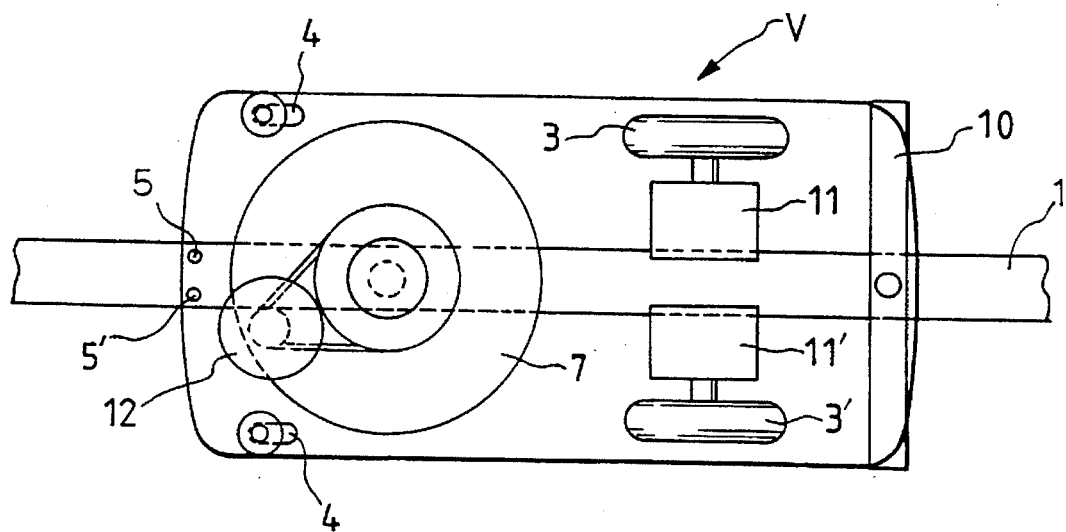
FIG. 1B is a plan view thereof along A—A line of FIG. 1A.

The embodiments of the present invention will be described with reference to the accompanying drawings. In FIGS. 1A and 1B, reference numeral 1 designates a guidance line, which was drawn with a luminous material or a coating material mainly consisting thereof along a predetermined traveling path on a floor surface 2. A self-advancing floor washing machine V is guided to travel along guidance line 1.

The guidance line 1 is drawn on the floor surface 2 by applying a mixture in which the luminous material is dissolved or dispersed in a solvent, to the floor surface 2. Alternatively, a mixture in which the luminous material is mixed in a coating agent such as floor polish may be applied to the floor surface 2 to form the guidance line 1. This guidance line 1, that is, the luminous material thus drawn, is normally coated with about three layers of a protective coating agent such as floor polish, but the invention is by no means limited to this.

The luminous material may be selected for example from ultraviolet-absorbing materials, infrared-absorbing materials, and visible-light absorbing materials. The ultraviolet-absorbing materials are materials having such characteristics (luminescence) that they are excited with absorption of light in the ultraviolet region and then emit wavelength-converted light in the visible region when returning from an unstable excited state to a stable ground state. Similarly, the infrared-absorbing materials are materials absorbing light in the infrared wavelength region to emit visible rays, and the visible-light-absorbing matters are materials absorbing light in a certain visible wavelength region to emit light in another region different in wavelength therefrom. Particularly preferable from the viewpoint of retaining the floor beauty are materials of a type which are colorless and not normally visible to the eye and which do not spoil a color tone of the floor surface.

The floor washing machine V is a traveling device consisting of two drive wheels 3, 3' set left and right in the rear part of the machine and two casters 4 set left and right in the front part, etc., a guidance device consisting of two photosensors 5, 5' and a controlling unit 6, and a washing device consisting of a rotary brush 7, a detergent tank 8, a dirty water tank 9, and a squeegee 10.

The left drive wheel 3' and right drive wheel 3 are driven to rotate independently of each other by respective drive motors 11, 11' for exclusive use by each wheel. Accordingly, by driving motor 11 to rotate only the right drive wheel 3, the floor washing machine V can turn about the left drive wheel 3'. Conversely, by driving motor 11' to rotate only the left drive wheel 3', the machine can make a right turn. Further, the machine can advance drawing a curve of a desired size to the right or to the left by rotating speeds of the left drive wheel 3' and right drive wheel 3 at different speeds from each other. Moreover, by reversing the drive wheels 3, 3', the floor washing machine V can recede (or move backward). In addition, the machine can make a quick turn by rotating the left drive wheel 3' and right drive wheel 3 in mutually opposite rotation directions. While a two-drive wheeled vehicle is shown, it is understood that other drive means such a treads, tracks or other propulsion means can be used equally well.

Each photosensor 5, 5' is mainly composed of a light-emitting device such as a light-emitting diode and a light-receiving device such as a photo transistor. The light-emitting device emits light of a predetermined wavelength (ultraviolet rays, visible rays, or infrared rays) toward the luminous coloring matter in the guidance line 1 on the floor surface. The light-receiving device receives and measures light of another wavelength (ultraviolet rays, visible rays, or infrared rays) emitted from the luminous material absorbing the light emitted from the light-emitting device. An infrared sensor is used in cases receiving infrared light. The two photosensors 5, 5' are aligned in the direction perpendicular to the longitudinal direction of the guidance line 1 so that they are located within the width of the guidance line 1.

Receiving information signals from the photosensors 5, 5' the control unit 6 sends a control signal to one or both of the drive motors 11, 11'. Namely, when the photosensors 5, 5' are located right above the guidance line 1, they receive a predetermined level of emitted light from the luminous material in the guidance line 1 to send normal signals to the control unit 6. If the floor washing machine V deviates from the track, photosensor 5 or 5' fails to receive the light from the guidance line 1 to send an abnormal signal.

When receiving the abnormal signal, the control unit 6 immediately sends a command signal to the drive motors 11 or 11' to control the drive wheels 3 or 3' so as to correct the traveling direction of the floor washing machine V.

The washing device is so arranged that a drive motor 12 rotates the rotary brush 7 to wash the floor surface 2 while supplying a detergent from the detergent tank 8. The squeegee 10 draws in dirty water after washing by suction to put it into the dirty water tank 9. Since the detergent tank 8 is a flexible package located inside the dirty water tank 9, it contracts as the detergent amount decreases. That decrease increases the capacity of the dirty water tank 9 and thus it can hold a larger amount of dirty water.

Industrial Applicability

The operation of the water floor washing machine V of the above embodiment is next described. First, while rotating the rotary brush 7 by the drive motor 12, the detergent in the detergent tank 8 is supplied to the center portion of the rotary brush 7. The rotary brush is lowered onto the floor surface 2 to wash the floor surface.

At the same time, the left drive motor 11' and right drive motor 11 are activated to rotate the drive wheels 3' and 3 so as to make the floor washing machine V advance. At the starting point, the two photosensors 5 and 5' are manually located right above the guidance line 1. After the floor washing machine V starts advancing, the squeegee 10 is lowered onto the floor surface 2 to draw in the dirty water by suction.

Figure 2:
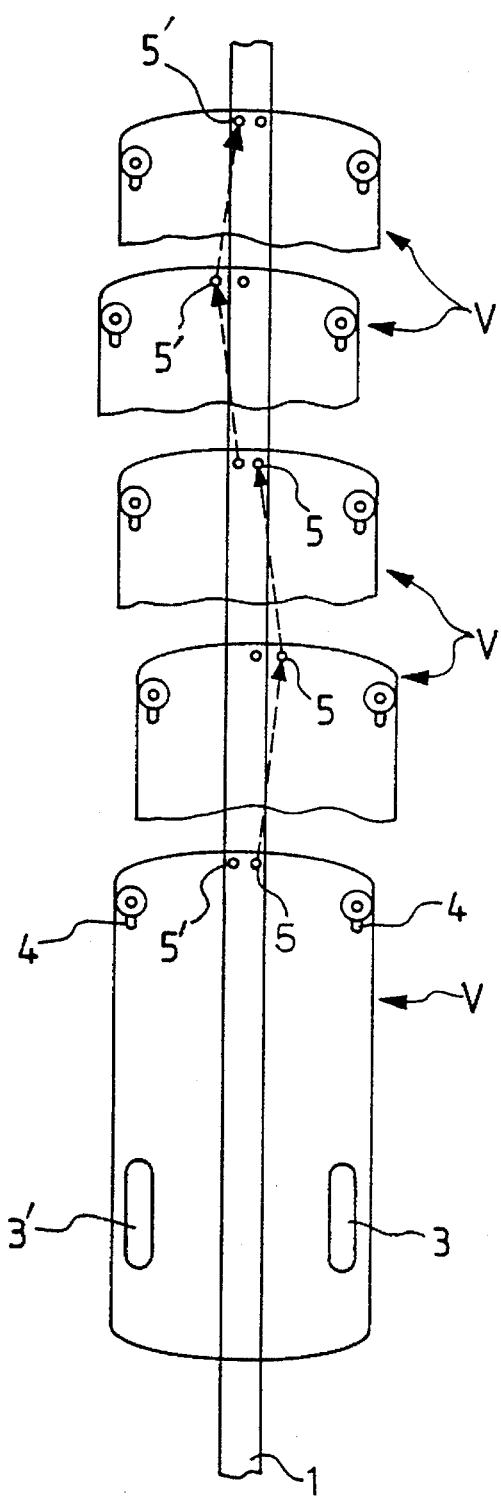
FIG. 2 is an explanatory drawing to illustrate a method for correcting the traveling direction using a guidance system according to the present invention.

As the floor washing machine V advances, it may start to deviate from the guidance line 1. For example, if it deviates to the right from the guidance line 1, the right photosensor 5 deviates from the guidance line 1, as shown in FIG. 2, and the sensor 5 sends an abnormal signal to the control unit 6. The control unit 6 immediately sends a control signal to the drive motors 11, 11' to increase the rotation speed of the right drive wheel 3 or to decrease the rotation speed of the left drive wheel 3'. The track of the floor washing machine V is then corrected to the left so as to locate the right photosensor 5 again on the guidance line 1. Conversely, if the floor washing machine V deviates to the left, the left photosensor 5' deviates from the guidance line 1 to generate an abnormal signal, whereby the track or direction of the machine is corrected to the right.

The above embodiment is so arranged that the two photosensors 5 and 5' are aligned within the width of the guidance line 1. A deviating direction is detected by a first deviating photosensor 5 or 5'. However, the present invention is by no means limited to this arrangement. For example, a possible arrangement is such that two photosensors 5 and 5' are arranged on either side of the guide line 1 and that an abnormal signal is generated when either one of the left or right photosensors 5, 5' goes into the guidance line 1.

In another arrangement, the number of the photosensors 5, 5' can be increased to be set at suitable positions, whereby a more precise guidance control can be performed.

Figure 3:
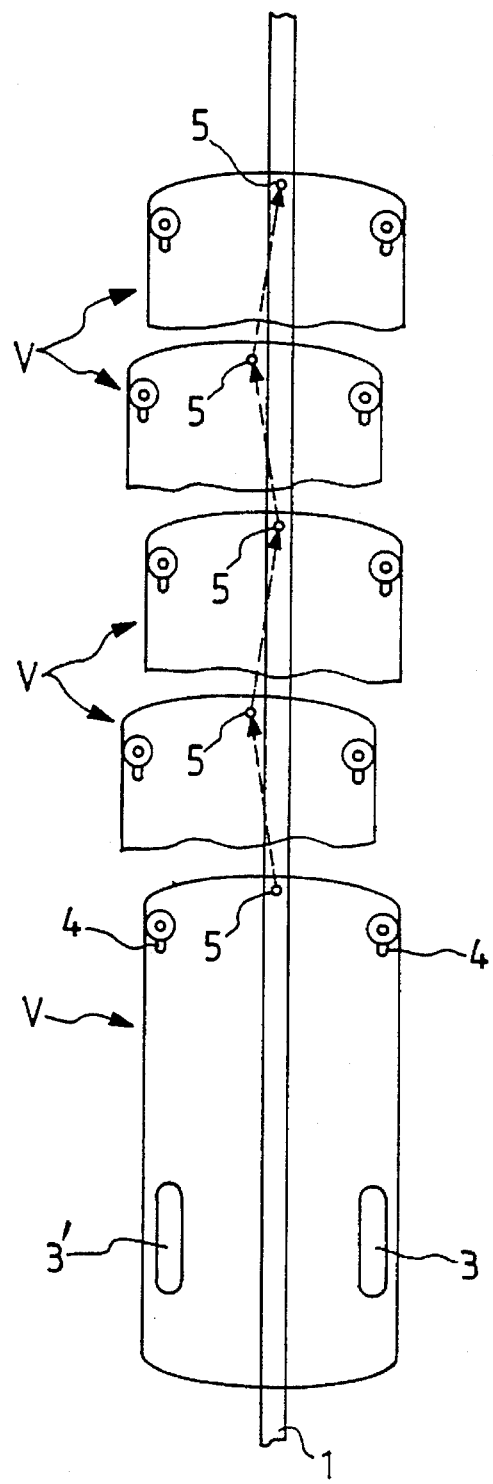
FIG. 3 is a drawing to show another method for correcting the traveling direction using another guidance system according to the present invention.

The above embodiment was explained as to the guidance control method with a plurality of photosensors 5, 5'. However, the control can be done with a single photosensor 5 employing such an arrangement that the traveling drive apparatus is preliminarily set with a tendency for the floor washing machine V to deviate to a specific side (to the right or to the left) of the guidance line 1. In this embodiment, the correction of track is always made only in one direction, as shown in FIG. 3, in the same general manner as described for FIG. 2 above, except there is only one sensor to generate an abnormal signal.

Although the above embodiment showed the floor washing machine V, the self-advancing vehicle of the present invention is not limited to this. The present invention can be applied to any self-advancing vehicle which can travel on a surface of by automatic operation. Further, the traveling device of the self-advancing vehicle is not limited to that in the above embodiment, but any other traveling device than that in the above embodiment can be employed as long as it has a mechanism capable of automatically traveling in accordance with the control signal from the control unit to the steering means such as the motors 11, 11' and driving wheels 3, 3'.

Table 1 shows specific examples of luminous materials dissolved in a solvent, which may be used in the present invention.

TABLE 1

|  | A | B | C |
| --- | --- | --- | --- |
| (1) EB-501 | 0.03 | — | — |
| (2) EG-302 | — | 0.02 | — |
| (3) Kayact Luminous C-B | — | — | 0.05 |
| Benzene | 99.97 | 99.98 | 50.00 |
| Ethanol | — | — | 49.95 |
| Water | — | — | — |
| TOTAL | 100.0 | 100.0 | 100.0 |

(1) A luminous coloring material manufactured by Mitsui Toatsu Kagaku, which converts ultraviolet light into blue light (433 nm) to be emitted.
(2) A luminous color material manufactured by Mitsui Toatsu Kagaku, which converts ultraviolet light into light of yellow green (524 nm) to be emitted.
(3) A photochromic coloring material manufactured by Nippon Kayaku.

Table 2 shows specific examples of ultraviolet-absorbing coloring materials mixed in floor polish.

TABLE 2

|  | D | E | F |
| --- | --- | --- | --- |
| EB-501 | 0.02 | — | — |
| EG-302 | — | 0.03 | — |
| Kayact Luminous C-B | — | — | 0.05 |
| Acrylonitrile-styrene copolymer emulsion (35%) | 35.00 | 35.00 | 28.00 |
| Tributoxyethyl Phosphate | 1.80 | 1.80 | 1.00 |
| Diethylene glycol monoethyl ether | 3.00 | 3.00 | 3.00 |
| Dipropylene glycol monoethyl ether | 2.00 | 2.00 | 2.00 |
| (1) Topco ® LR-400-30WS (30%) | 2.00 | 2.00 | 1.70 |
| (2) Hitec ® E-4B-S (40%) | 3.50 | 3.50 | 2.45 |
| Ammonium zinc carbonate Solution (12%) | 4.00 | 4.00 | 3.20 |
| Zonyl ® FSE (14%) | 0.08 | 0.08 | 0.08 |
| (3) Deltop ® Preservative | 0.10 | 0.10 | 0.10 |
| Water | 48.50 | 48.49 | 58.42 |
| TOTAL | 100.0 | 100.0 | 100.0 |

(1) A resin fumaric ester gum ammonium solution produced by Toyo Petrolite Co., Ltd.
(2) An oxidized polyethylene wwax emulsion produced by Toho Chemical Industry Co., Ltd.
(3) Halogenated acetoamide monoiodide from Takeda Chemical Dindustries, Ltd.

Many embodiments and modifications of the present invention may be constructed without departing from the spirit and scope of the invention. It should be understood that the present invention is by no means limited to the specific embodiments or examples described in the specification.

What is claimed is:

1. A guidance system for a self-advancing vehicle comprising
   A. a guidance line on a surface over which the vehicle is to pass wherein the guidance line comprises a luminous material that emits light of a first wavelength when excited by light of a second wavelength from a light emitter means wherein the guidance line is drawn onto the surface using a composition selected from the group consisting of the luminous material dissolved or dispersed in a solvent and the luminous material dissolved or dispersed in a coating composition; and
   B. at least one photosensor that is oriented to pass over the guidance line, the photosensor comprising the combination of
      (1) the light emitter oriented to beam the light of the second wavelength onto the guidance line and working in cooperation with
      (2) a light receiver oriented to detect the light of the first wavelength emitted from the guidance line when the light of the second wavelength is beamed onto the guidance line wherein the light receiver generates a first signal proportional to the amount of first wavelength light being received;
   C. a control unit means for receiving the signal from the light receiver and, in response to the first signal, sending a second signal to
   D. a steering means on the vehicle such that the second signal causes the steering means to orient the vehicle in such a mariner as to maintain the photosensor over the guidance line and thereby cause the vehicle to follow the guidance line as it advances.

2. The system as claimed in claim 1 wherein there are two photosensors, each of which provides a signal to the steering means to cause the vehicle to follow the guidance line as it advances.

3. The system as claimed in claim 1 wherein the luminous material is selected from the group consisting of an ultraviolet-absorbing material, an infrared-absorbing material, and a visible light-absorbing material.

4. The system as claimed in claim 3 wherein the luminous material is not normally visible to the eye.

5. The system as claimed in claim 1 wherein the luminous material is dissolved in a floor polish.

6. The system as claimed in claim 1 wherein a protective coating agent is applied over the guidance line.

7. The system as claimed in claim 1 wherein there is only one photosensor present and the guidance means is set to generally turn the vehicle to one side away from the guidance line and the signal sent from the photosensor causes the guidance means to turn the vehicle in towards the opposite side and thereby cause the vehicle to follow the guidance line as it advances.

* * * * *